(12) United States Patent
Gandhi et al.

(10) Patent No.: US 10,207,665 B2
(45) Date of Patent: Feb. 19, 2019

(54) BUMPER DESIGN USING SHEAR THICKENING FLUIDS

(71) Applicant: Toyota Motor Engineering & Manufacturing North America, Inc., Erlanger, KY (US)

(72) Inventors: Umesh N. Gandhi, Farmington Hills, MI (US); Yuyang Song, Ann Arbor, MI (US); Shardul S. Panwar, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 6 days.

(21) Appl. No.: 15/474,423

(22) Filed: Mar. 30, 2017

(65) Prior Publication Data
US 2018/0281714 A1     Oct. 4, 2018

(51) Int. Cl.
*B60R 19/20* (2006.01)
*B60R 19/03* (2006.01)
*C08K 3/36* (2006.01)

(52) U.S. Cl.
CPC .............. *B60R 19/20* (2013.01); *B60R 19/03* (2013.01); *C08K 3/36* (2013.01); *C08K 2201/003* (2013.01); *C08K 2201/011* (2013.01)

(58) Field of Classification Search
CPC .......... B60R 19/20; B60R 19/03; C08K 3/36; C08K 2201/003; C08K 2201/011
(Continued)

(56) References Cited

U.S. PATENT DOCUMENTS

| 3,947,061 A | 3/1976 | Ellis |
| 7,261,345 B2 | 8/2007 | Akad |

(Continued)

FOREIGN PATENT DOCUMENTS

DE     102005008093 A1     10/2005

OTHER PUBLICATIONS

M. Soutrenon et al., Impact Absorption of Composites With Shear Thickening Fluid Filled Foams, The 19th International Conference on Composite Materials; Montreal, Canada; Jul. 29, 2013 (9 pages).

*Primary Examiner* — Joseph D. Pape
*Assistant Examiner* — Dana D Ivey
(74) *Attorney, Agent, or Firm* — Christopher G Darrow; Darrow Mustafa PC (57) ABSTRACT

A variable shear control energy absorption system for a vehicle is provided. The system may include a vehicle frame component and a primary deformable impact absorber located adjacent the vehicle frame component. The vehicle frame component may be a bumper reinforcement member. The system may include a plurality of secondary deformable impact chambers located within the primary deformable impact absorber, each secondary deformable impact chamber including a shear thickening fluid that exhibits an increasing or decreasing viscosity responsive to an impact force. At least one elastic relief chamber is provided in fluid communication with the plurality of secondary deformable impact chambers. The elastic relief chamber is configured to temporarily accept the shear thickening fluid from the plurality of secondary deformable impact chambers during low force impacts, and to redirect the shear thickening fluid back to the secondary deformable impact chambers after the low impact force recedes.

20 Claims, 9 Drawing Sheets

(58) Field of Classification Search
USPC .......................................................... 293/110
See application file for complete search history.

(56) References Cited

U.S. PATENT DOCUMENTS

| | | |
|---|---|---|
| 7,448,678 B2 | 11/2008 | Browne et al. |
| 9,303,709 B2 | 4/2016 | Manes et al. |
| 9,453,550 B2 | 9/2016 | Smith et al. |
| 2007/0070053 A1 | 3/2007 | Lapstun et al. |
| 2012/0186003 A1 | 7/2012 | Heger et al. |
| 2012/0204451 A1 | 8/2012 | De Roode et al. |
| 2013/0300139 A1 | 11/2013 | Fukawatase |
| 2015/0223542 A1 | 8/2015 | Fischell et al. |
| 2015/0367796 A1* | 12/2015 | Farooq ................ B60R 19/20 293/109 |
| 2015/0367799 A1* | 12/2015 | Le ........................ B60R 21/0136 701/45 |
| 2016/0310822 A1 | 10/2016 | Kender et al. |

* cited by examiner

BUMPER DESIGN USING SHEAR THICKENING FLUIDS

TECHNICAL FIELD

The present disclosure generally relates to vehicle energy absorbers and, more particularly, to a vehicle bumper system incorporating a shear thickening fluid to tailor energy absorption.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicle and automobile bodies may typically be formed of a number of metal, plastic, and composite outer components that are ultimately mounted on underlying frame components, sometimes referred to as the main rails, or a frame assembly. Various energy absorption systems, such as energy absorbing bumper assemblies, crush lobes, and buckling attachment brackets, are often used to absorb and transfer impact energy from outer components to the frame assembly. Energy absorption systems play an important role with vehicle safety considerations and may be subject to various regulations with respect to both protecting pedestrians and protecting vehicle occupants during impacts of variable speeds. Expanded polypropylene (EPP) foam has been used in combination together with high strength metal beams to provide bumper assemblies with appropriate crash performance. However, each material may be working separately, and heavy metal beams add to the overall weight of a vehicle.

Accordingly, it would be desirable to provide an improved energy absorption system that is less in weight and where the materials better complement one another.

SUMMARY

This section provides a general summary of the disclosure, and is not a comprehensive disclosure of its full scope or all of its features.

In various aspects, the present teachings provide a variable shear control energy absorption system for a vehicle. The system may include a vehicle frame component and a primary deformable impact absorber located adjacent the vehicle frame component. A plurality of secondary deformable impact chambers are provided, located within the primary deformable impact absorber. Each secondary deformable impact chamber may include a shear thickening fluid that exhibits a decreasing viscosity responsive to an impact force exerting a first range of shear rates, and exhibits an increasing viscosity responsive to an impact force exerting a second range of higher shear rates. The system may include at least one elastic relief chamber in fluid communication with the plurality of secondary deformable impact chambers. The elastic relief chamber is configured to temporarily accept the shear thickening fluid from the plurality of secondary deformable impact chambers after the plurality of secondary deformable impact chambers receive an impact force exerting shear rates within the first range. The elastic relief chamber is also configured to redirect the shear thickening fluid back to the secondary deformable impact chambers after the impact force recedes.

In other aspects, the present teachings provide a vehicle bumper assembly with a variable shear control energy absorption system. The assembly may include a bumper reinforcement member defining an interior cavity. A primary deformable impact absorber may be provided, adjacent to the bumper reinforcement member. A plurality of secondary deformable impact chambers may be located within the primary deformable impact absorber, with each secondary deformable impact chamber comprising a shear thickening fluid. The assembly may include at least one elastic relief chamber located within the interior cavity of the bumper reinforcement member and in fluid communication with the plurality of secondary deformable impact chambers. The shear thickening fluid is fluidic and exhibits a decreasing viscosity responsive to an impact force exerting less than a predetermined shear rate, and the shear thickening fluid stiffens to a solid-like state and exhibits an increasing viscosity responsive to an impact force exerting greater than the predetermined shear rate.

In still other aspects, the present teachings provide methods of using shear thickening fluids with a vehicle bumper assembly to dampen and transfer impact forces over a wide range of vehicle speeds, with minimal physical damage to the components of vehicle bumper assembly.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a variable shear control energy absorption system for a vehicle. The system may include a vehicle frame component and a primary deformable impact absorber located adjacent the vehicle frame component. The vehicle frame component may be a bumper reinforcement member. The system may include a plurality of secondary deformable impact chambers located within the primary deformable impact absorber, each secondary deformable impact chamber including a shear thickening fluid that exhibits an increasing or decreasing viscosity responsive to an impact force. At least one elastic relief chamber is provided in fluid communication with the plurality of secondary deformable impact chambers. The elastic relief chamber is configured to temporarily accept the shear thickening fluid from the plurality of secondary deformable impact chambers during low force impacts, and to redirect the shear thickening fluid back to the secondary deformable impact chambers after the low impact force recedes.

Figure 1:
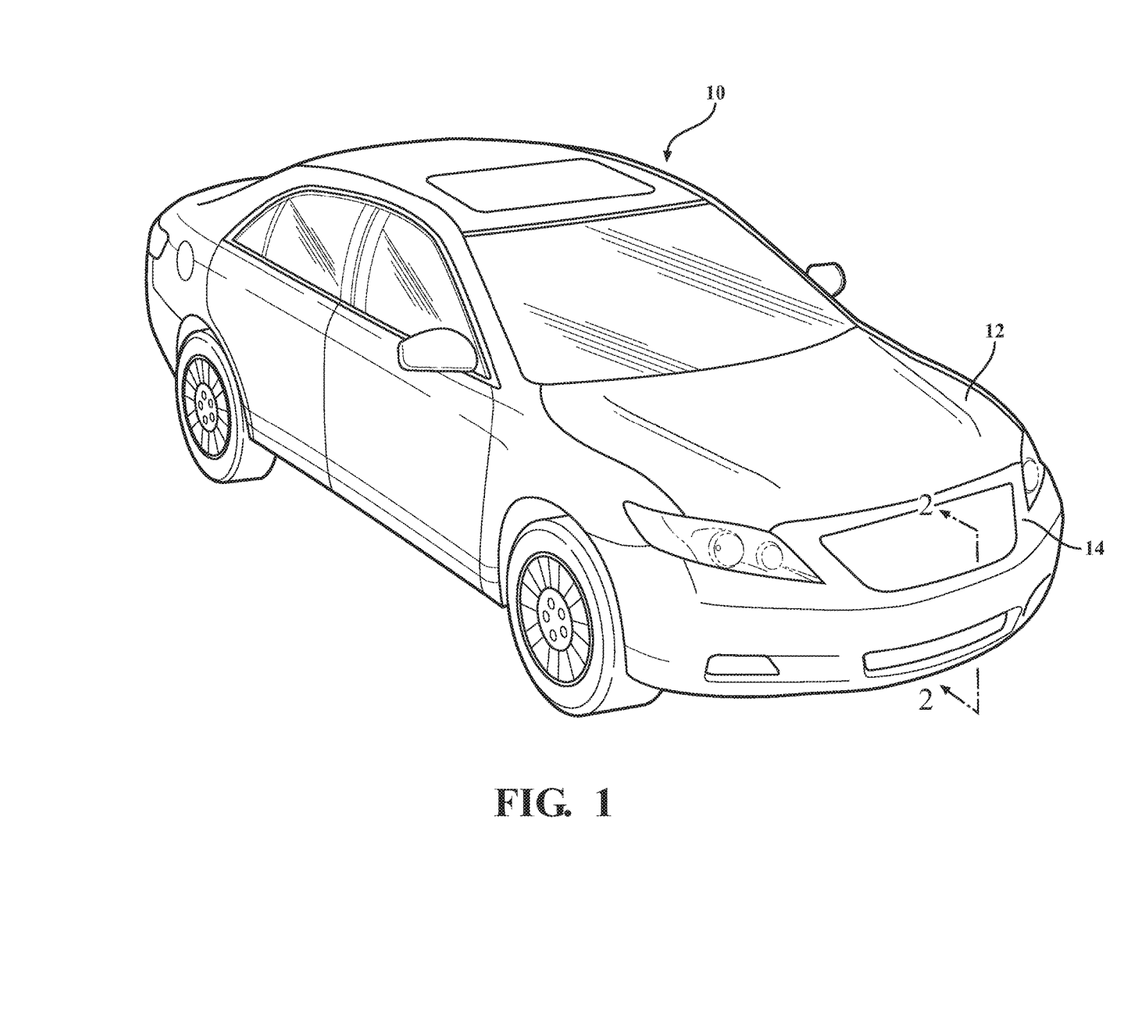
FIG. 1 illustrates an exemplary vehicle in which the energy absorption system of the present technology can be utilized.

FIG. 1 shows an example of a vehicle 10 in which the energy absorption system of the present technology can be utilized. As used herein, "vehicle" means any form of motorized transport, including manually driven or partially or fully autonomously controlled. In one or more implementations, the vehicle 10 can be an automobile. While arrangements will be described herein with respect to automobiles, it will be understood that embodiments are not limited to automobiles or passenger-carrying vehicles. In certain implementations, the vehicle 10 may be a watercraft, an aircraft, a train, or any other form of motorized transport, including yard vehicles, farm vehicles, various recreational vehicles, and the like. As shown, the vehicle 10 may include a hood member 12, or equivalent panel with an edge portion 14 that may ultimately be located adjacent an impact absorption system, such as a bumper assembly 16.

Figure 2:
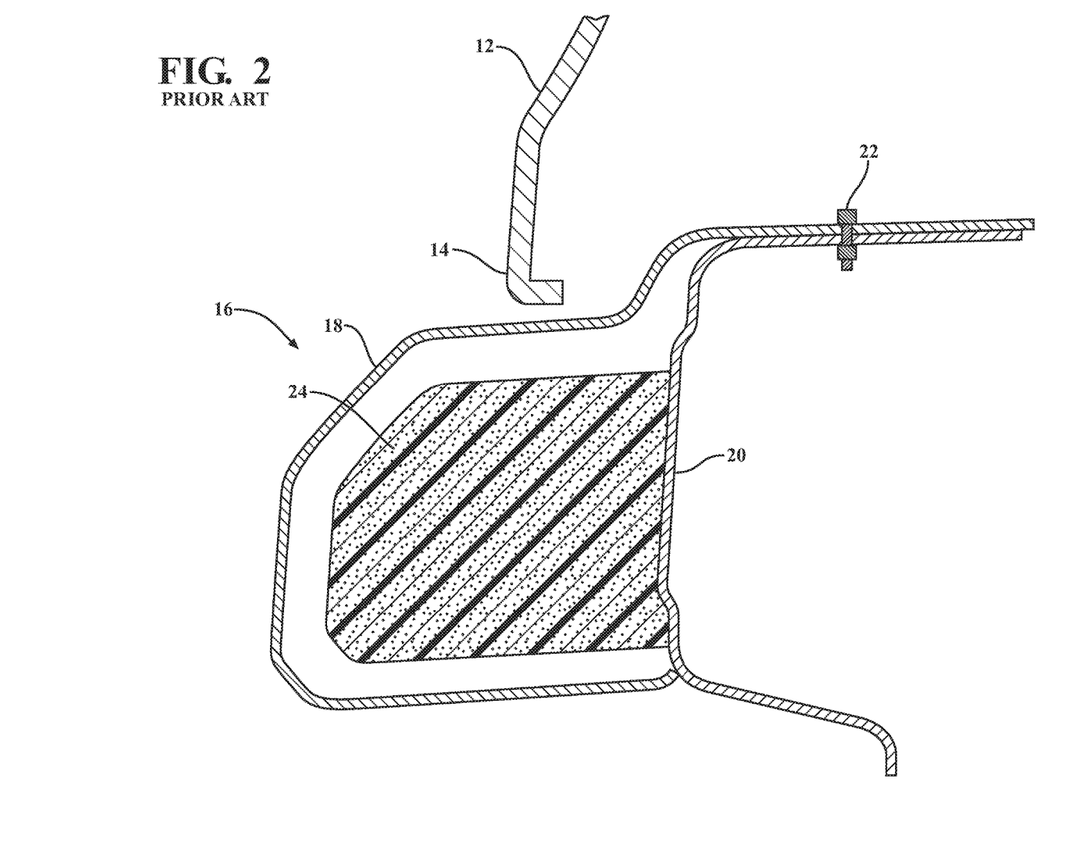
FIG. 2 is a cross section taken along the line 2-2 of FIG. 1 illustrating a representative prior art vehicle bumper assembly.

FIG. 2 is a cross section taken along the line 2-2 of FIG. 1 illustrating a representative prior art bumper assembly 16. As shown, the assembly 16 may include a fascia component 18 coupled to a vehicle frame component, such as a bumper reinforcement member 20. As shown, the fascia 18 may be coupled to the bumper reinforcement member 20 with various mechanical fasteners 22. By way of example, FIG. 2 includes an expanded polypropylene (EPP) foam component 24 that is used in combination together with the bumper reinforcement member 20 in order to transfer impact energy to the main rails. Once it receives an impact, however, the foam component 24 may not retain the same initial integrity to receive additional impacts.

Figure 3:
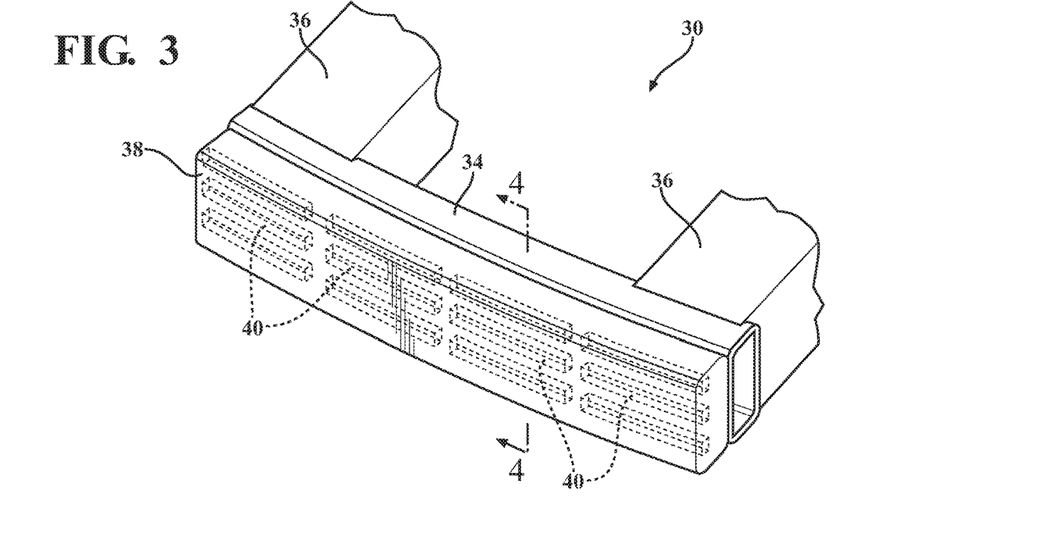
FIG. 3 is a perspective schematic view of one exemplary vehicle bumper assembly according to a first aspect of the present technology.
Figure 4:
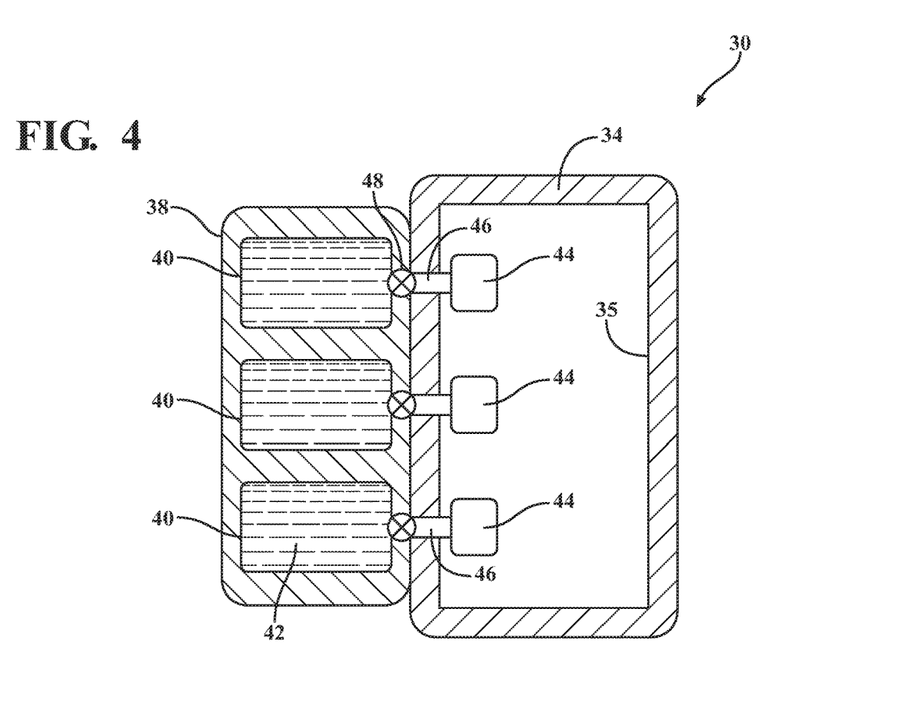
FIG. 4 is a cross section of the bumper assembly of FIG. 3, taken along the line 4-4.
Figure 5:
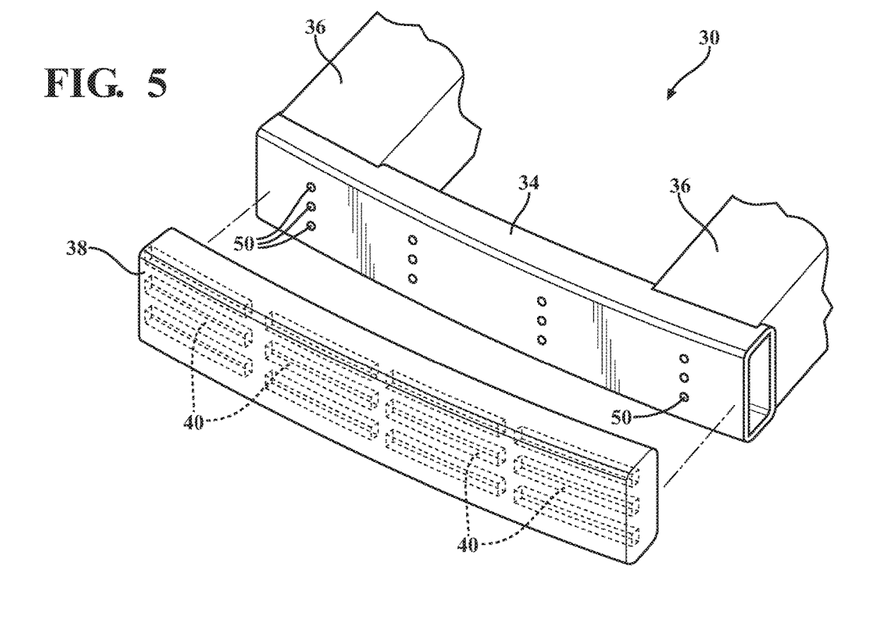
FIG. 5 is a partial exploded view of the vehicle bumper assembly of FIG. 3.

FIG. 3 is a perspective schematic view of one exemplary bumper assembly 30 according to a first aspect of the present technology. FIG. 4 is a cross section of the bumper assembly 30 of FIG. 3, taken along the line 4-4. FIG. 5 is a partial exploded view of the assembly 30 of FIG. 3. Although not shown for simplicity, the assembly 30 may similarly include a fascia component coupled to a vehicle frame component, such as a bumper reinforcement member 34, with various mechanical fasteners as shown in FIG. 2. The bumper reinforcement member 34 may be coupled to the main rails 36, or a frame assembly, and define an interior cavity 35. The interior cavity 35 may be a single cavity extending an entirety of the length and width, as shown, or it include a plurality of interior walls providing additional cavities, partitions, compartments, or the like. A primary deformable impact absorber 38 may be provided, located adjacent the vehicle frame component 34. In various aspects, the primary deformable impact absorber 38 may have height and length dimensions similar to that of the bumper reinforcement member 34. The primary deformable impact absorber 38 may be coupled to, arranged adjacent to, or otherwise secured or mechanically joined to the bumper reinforcement member 34 using various known techniques. The present technology contemplates the use of a single primary deformable impact absorber 38, as well as a plurality of primary deformable impact absorbers 38 (not shown) arranged in a manner suitable for their intended purpose, as will be described herein. In various aspects, the primary deformable impact absorber 38 may be a rubber or silicone material, formed or shaped as appropriate. The primary deformable impact absorber 38 is configured to be temporarily deformable as well as configured to be able to return to its original shape after receiving an impact.

As shown in FIG. 3, at least one, and preferably a plurality, of secondary deformable impact chambers 40 may be located within the primary deformable impact absorber 38. In various aspects, the primary deformable impact absorber 38 may define at least one or all of the secondary deformable impact chambers 40. In this regard, the secondary deformable impact chambers 40 may be fully encapsulated within the primary deformable impact absorber 38. In other aspects, the secondary deformable impact chambers 40 may be separate components, for example, rubber or another suitable elastic component, disposed within the primary deformable impact absorber 38. In still other aspects, the secondary deformable impact chambers 40 may be individually removable and replaceable. In addition, the primary deformable impact absorber 38 can also be removed and replaced.

Figure 6A:
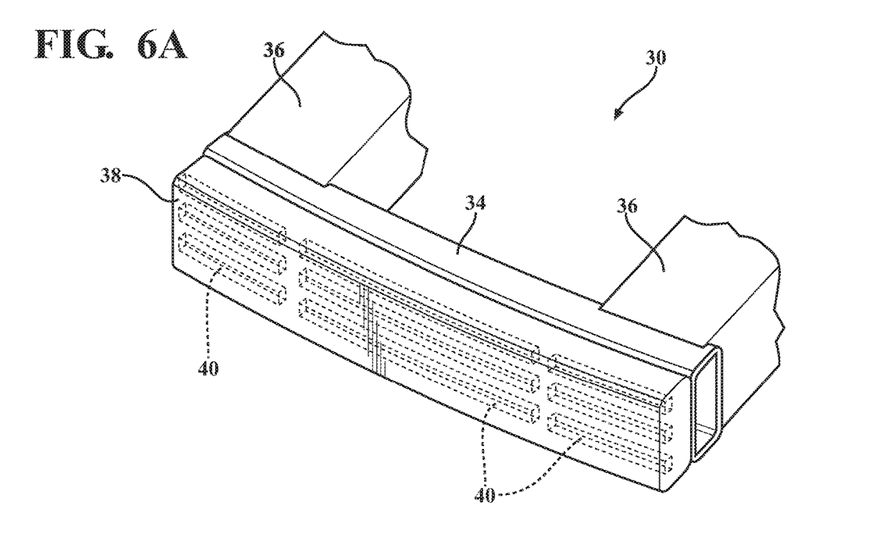
FIGS. 6A-6C illustrate perspective schematic views, each with an array of secondary deformable impact chambers according to various aspects.
Figure 6B:
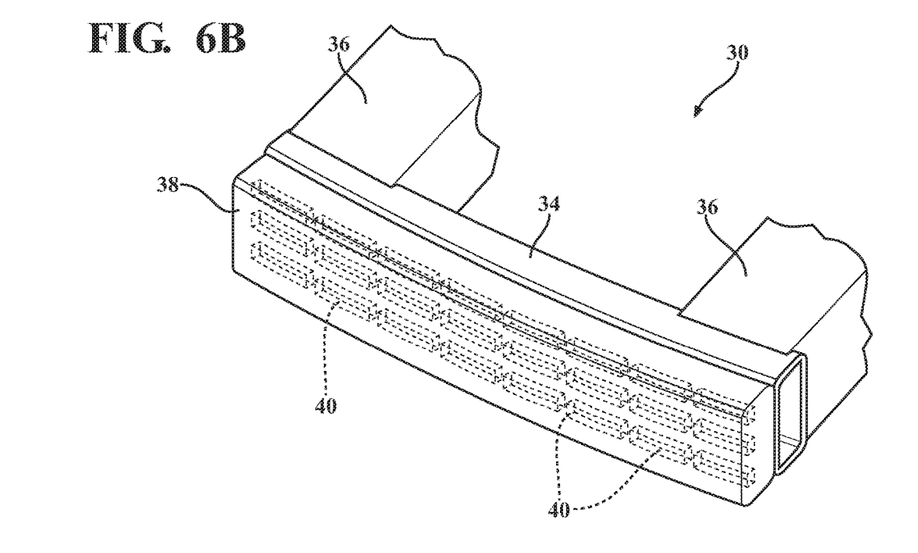
Figure 6C:
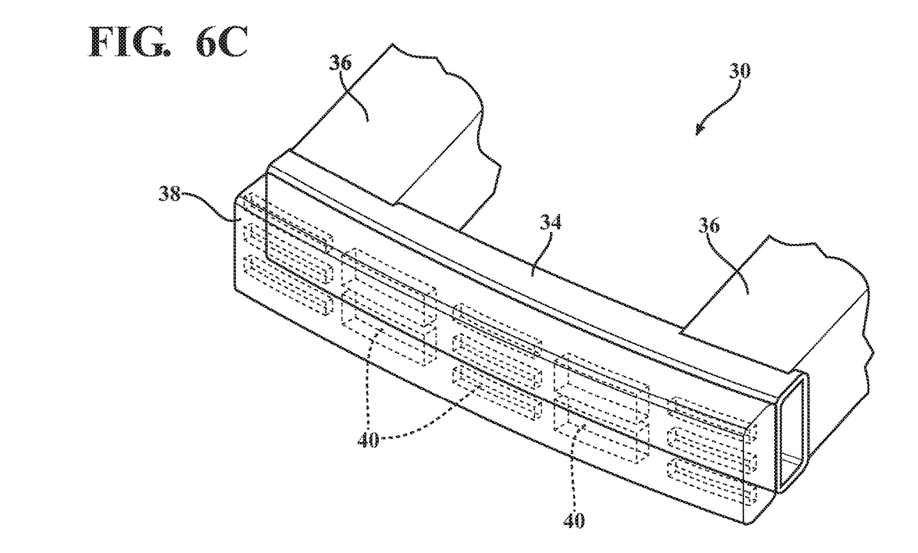

FIGS. 6A-6C are perspective, schematic type illustrations showing an energy absorption system assembly 30 with various other non-limiting configurations, each with an array of secondary deformable impact chambers 40 according to various aspects For example, FIG. 6A illustrates three columns of secondary deformable impact chambers 40 aligned in a longitudinal direction with respect to the vehicle frame component or bumper reinforcement member 34, and three rows aligned in a vertical direction, with the center column of chambers 40 having a larger size. Of course, it should be understood that there may be any desired number of columns and rows of chambers of varying sizes and shapes. For example, FIG. 6B illustrates a plurality of smaller secondary deformable impact chambers 40 aligned in a two-dimensional array. In various aspects, the smaller chambers 40 as shown in FIG. 6B may be provided having non-limiting dimensions of about 40-50 mm in width, about 80-100 mm in length, and about 40-50 mm in height. FIG. 6C illustrates yet another non-limiting example of an alternating array pattern of secondary deformable impact chambers 40 according to certain aspects, with respective columns or series of secondary deformable impact chambers 40 having different sizes and shapes. In this regard, it is contemplated that the design and location of the secondary deformable impact chambers 40 can be tailored for specific energy absorption requirements or preferences. Thus, it should be understood that the present technology may be useful with any number of secondary deformable impact chambers 40. The secondary deformable impact chambers 40 may be provided in areas extending an entire length of the primary deformable impact absorber 38, or they may be strategically provided in certain areas. Still further, different areas may be provided with different, or variable, shear control energy absorption properties.

According to various aspects of the present technology, each secondary deformable impact chamber 40 may be filled with a shear thickening fluid 42. Different secondary deformable impact chambers 40 may not only be provided with different shapes and sizes, they may also be provided with different shear thickening fluids in order to provide different energy absorbing properties. As used herein, the term "shear thickening fluid" (or "STF") is meant to refer to a fluid that has an increasing viscosity when dynamically sheared or stressed, which is normally but not necessarily, reversible when the shear or stress condition is relaxed. A common non-limiting example may be a dilatant or rheopectic fluid. Typically, it is understood that a dilatant shear thickening fluid has a viscosity that increases with increasing shear rate, whereas a rheopectic shear thickening fluid has a viscosity that increases with the duration of an applied shear stress. At low rates, shear thickening fluids have low viscosity and may act as a lubricant. However, when an impact is applied at an increased shear rate, the fluid adopts a solid-like state and, due to a rapid increase in viscosity, becomes less penetrable. Shear thickening systems may be particle based or non-particle based. For particle based shear thickening fluids, particles are commonly added to a fluid using low speed mixer.

Thus, in various aspects of the present technology, shear thickening fluids may include, by way of a non-limiting example, colloidal dispersions of fine particles inside of a liquid. As used herein, "fine particles" may include particles that have a maximum size dimension of less than about 3 microns, in other instances the maximum size dimension may be less than about 2 microns, or less than 1 micron. According to some aspects, the fine particles may be organic, including for example, cornstarch, latex particles, polyethylene oxide. In other aspects, the fine particles may be inorganic, including for example, silica, and the like. In still other aspects, the fine particles may include a combination of organic and inorganic material.

With respect to examples of the shear thickening fluid, in various aspects the fluid may include: a mixture of polyethylene oxide and petroleum sulfonate; gypsum pastes; colloidal silica particle dispersions; colloidal latex dispersions; polyethylene glycol solutions; starch slurries; and the like. It should also be understood that the fine particles may also be of different shapes and sizes, which may also influence the rheological behavior of the mixture. For example, is has been understood that the shear thickening imparted by different shapes of the fine particles over a range of shear rates from $100\ s^{-1}$ to $300\ s^{-1}$ is generally that rod shapes>plates>grains>spheres. In some aspects, the fine particles are present in various predetermined quantities so as to impart a specified shear thickening behavior to the fluid. In one non-limiting example, the shear thickening fluid may be a hydrophilic, concentrated suspension of inorganic particles in a glycol medium, for example, STF-SG, commercially available from STF Technologies LLC of Delaware. The shear thickening fluid may optionally be used with a diluent to create a fluid with specifically tailored critical shear rates at a given level of stress.

Figure 7:
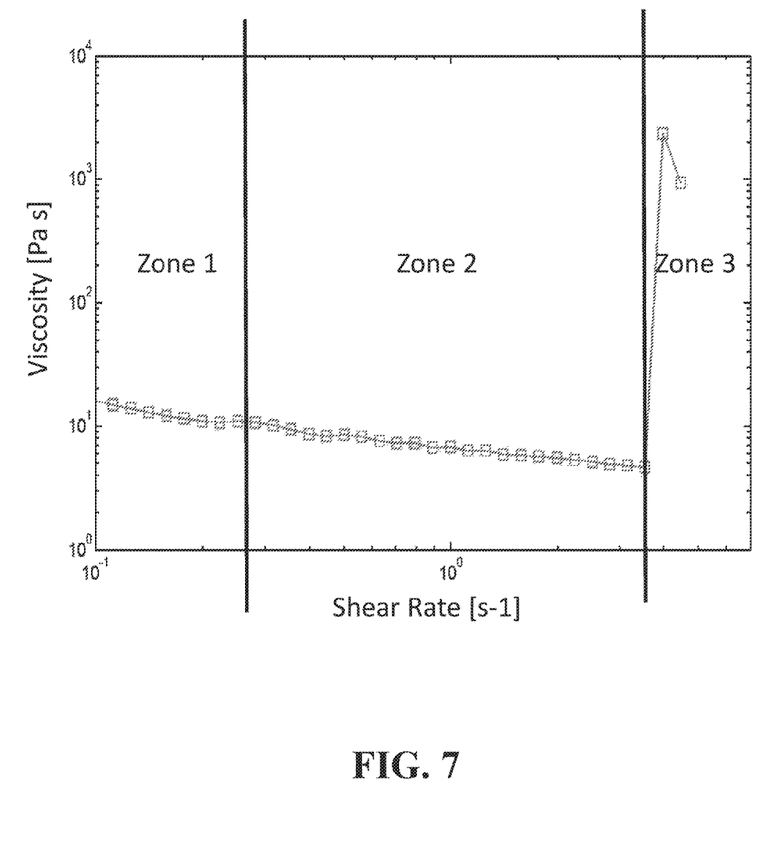
FIG. 7 illustrates a plot of shear rate versus flow viscosity for one exemplary shear thickening fluid useful with the present technology.

FIG. 7 illustrates a plot of shear rate versus flow viscosity for one exemplary shear thickening fluid that may be useful with the present technology. In the example, the shear thickening fluid is prepared with 500 nm diameter spherical silica particles commercially available from Nippon Shokubai Co., under reference name KEP50, mixed in a polyethylene glycol medium having with an average molecular weight of 200 g/mol (PEG200), commercially available from VWR International of Pennsylvania. The silica may be present at about 60% by weight. The silicone used for encapsulation is a flexible (shore hardness 18) polycondensated silicone (RHODORSIL RTV-3318), commercially available from Bluestar Silicones of South Carolina.

As shown, the shear thickening fluid exhibits a decreasing viscosity responsive to an impact force exerting a first range of shear rates up to a predetermined rate, and subsequently exhibits an increasing viscosity responsive to an impact force exerting a second range of higher shear rates higher than the predetermined rate. For illustrative purposes only, FIG. 7 is separated and labeled with three zones. Zone 1 is meant to represent shear rates that may commonly be exhibited in a first, low range of shear stress, which may result from an impact between an object and a vehicle travelling less than about 2.5 MPH. In this regard, the term "object" may include stationary objects, moving objects, other vehicles, and in certain aspects, pedestrians, that may collide with the energy absorption system and components of the present technology. Zone 2 is meant to represent shear rates that may commonly be exhibited in a second, medium range of shear stress, which may result from an impact between an object and a vehicle travelling less between about 2.5 MPH and about 12 MPH. Zone 3 is meant to represent shear rates that may commonly be exhibited in a third, high range of shear stress, which may result from an impact between an object and a vehicle travelling greater than about 12 MPH. In Zones 1 and 2, the viscosity of the shear thickening fluid slowly decreases with an increasing shear rate, and the shear thickening fluid is in a liquid state, with fluidic properties. Upon passing the predetermined shear rate, which is the shear rate that transitions from Zone 2 to Zone 3, the shear thickening fluid stiffens to a solid-like state and exhibits an increasing viscosity responsive to an impact force exerting greater than the predetermined shear rate. Shortly after receiving the impact, the shear thickening fluid relaxes and returns to a liquid state, with fluidic properties.

With renewed reference to FIG. 4, the variable shear control energy absorption system 30 may include at least one elastic relief chamber 44 in fluid communication with the plurality of secondary deformable impact chambers 40. As shown in FIG. 4, each of the plurality secondary deformable impact chambers 40 may be in fluid communication with a respective plurality of elastic relief chambers 44 located within the interior cavity 35 defined by the bumper reinforcement member 34. A plurality of transfer tubes 46 may be provided to enable the fluid communication between the respective chambers 40, 44. In various aspects, the length and diameter of the transfer tubes 46 may vary, and different transfer tubes may be provided with different lengths and/or different diameters. Depending upon the size and design, there may be a plurality of transfer tubes 46 coupling a single secondary deformable impact chamber 40 to the elastic relief chamber(s) 44.

In certain aspects, at least one valve 48 may be disposed in one or more of the transfer tubes 46 to retain the shear thickening fluid 42 within each secondary deformable impact chamber until the valve 48 is subjected to a predetermined pressure. The size and type of valve can be tailored to specific configurations, and the predetermined pressure can be customized and configured as desired, for example, based in part on the viscosity of shear thickening material used; the location, size, and shape of the secondary deformable impact chambers 40; as well as the diameter and number of transfer tubes 46. The valves 48 may be disposed in various locations, for example, in the secondary deformable impact chambers 40, in the transfer tubes 46, and/or at the entrances of the elastic relief chambers 44. With renewed reference to FIG. 5, the bumper reinforcement component 34 may be provided with a plurality of appropriately spaced-apart apertures 50 configured to receive the plurality of transfer tubes 46 in order to provide the desired fluid communication.

The elastic relief chambers 44 may be configured to temporarily expand and accept the shear thickening fluid 42 from the plurality of secondary deformable impact chambers 40 after the plurality of secondary deformable impact chambers 40 receive an impact force exerting shear rates within a first range, for example, where the shear thickening fluid remains in a fluidic state but exerts a predetermined pressure. Based in part on their elastic nature and desire to return to their original shape, the elastic relief chambers 44 are preferably configured to then contract and redirect the shear thickening fluid 42 back to the secondary deformable impact chambers 40 after the impact force recedes.

Figure 8A:
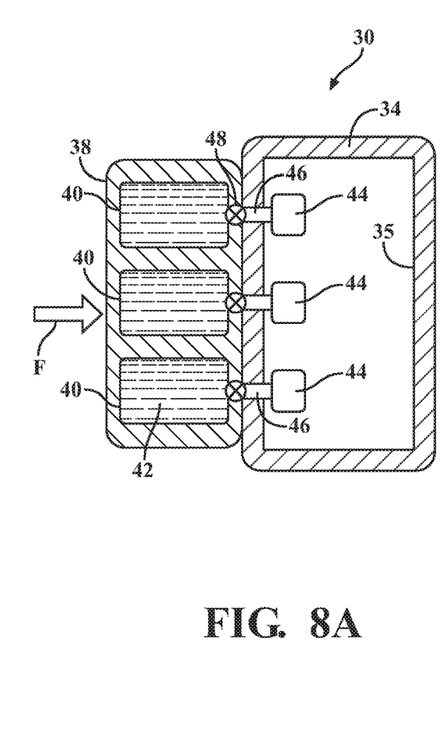
FIGS. 8A-8C illustrate the bumper assembly of FIG. 4 upon receiving a low force impact, for example, less than about 2.5 MPH, and returning to a rest state.
Figure 8B:
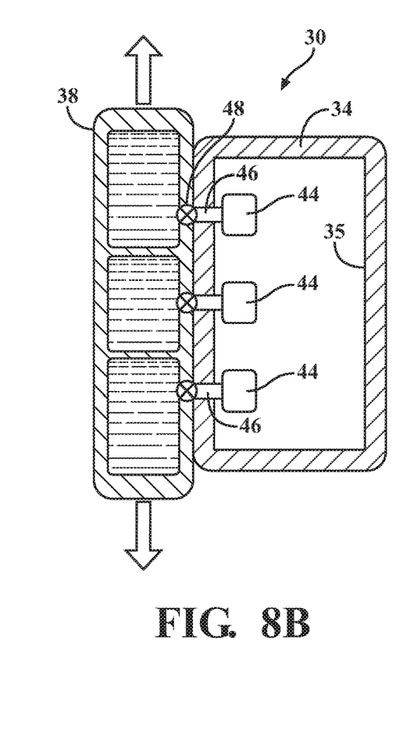
Figure 8C:
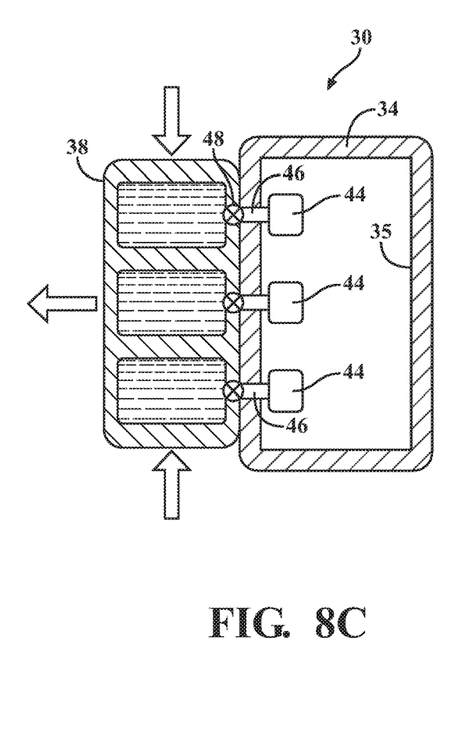

FIGS. 8A-8C provide a first illustrative example of the bumper assembly of FIG. 4 upon receiving a low force impact, for example, with a relative velocity between an object and a vehicle traveling less than about 2.5 MPH (i.e., Zone 1 of FIG. 7), and returning to a rest state. The primary deformable impact absorber 38 of FIG. 8A receives the impact force and, as shown in FIG. 8B, deforms upwards and downwards in the direction of the arrows. While the primary deformable impact absorber 38 and secondary deformable impact chambers 40 are shown as changing shape, the impact force and internal pressure is not great enough such that the shear thickening fluid is transferred to the elastic relief chambers 44. Rather, the viscosity of the shear thickening fluid is lowered and remains in a fluidic state in the secondary deformable impact chambers 40. After the impact force recedes, the primary deformable impact absorber 38 and the secondary deformable impact chambers deform back to their original shape in a rest position, as shown in FIG. 8C.

Figure 9A:
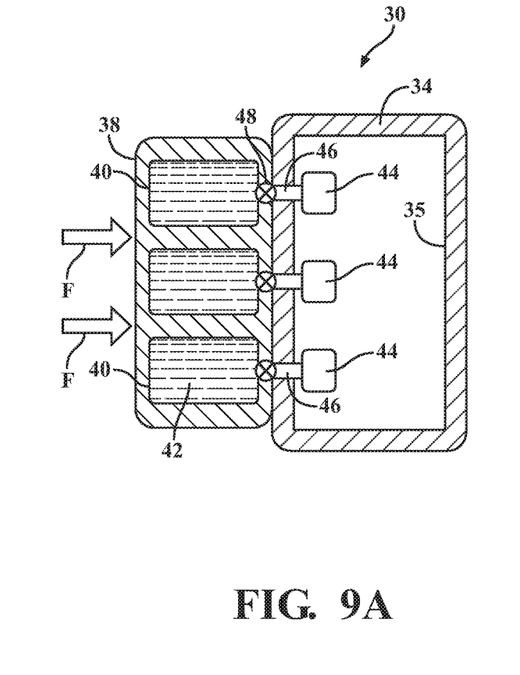
FIGS. 9A-9C illustrate the bumper assembly of FIG. 4 upon receiving a medium force impact, for example, between about 2.5-12 MPH, and returning to a rest state.
Figure 9B:
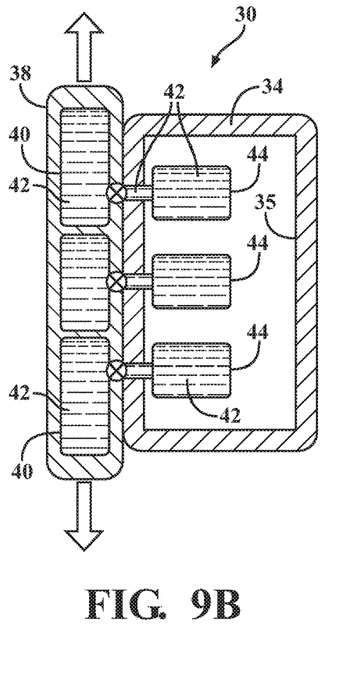
Figure 9C:
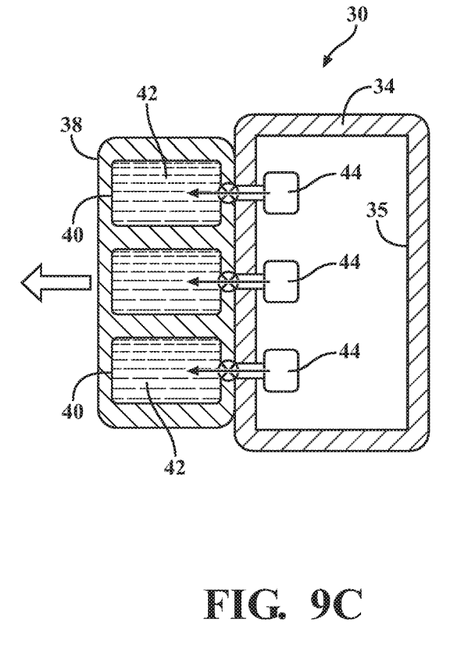

FIGS. 9A-9C provide a second illustrative example of the bumper assembly of FIG. 4 upon receiving a medium force impact, for example, with a relative velocity between an object and a vehicle traveling between about 2.5-12 MPH (i.e., Zone 2 of FIG. 7), and returning to a rest state. In this example, the primary deformable impact absorber 38 of FIG. 9A receives the impact force is configured to compress the secondary deformable impact chambers 40. The pressure in the chambers 40 exceeds a predetermined threshold, and at least a portion of the shear thickening fluid 42 (while remaining in a fluidic state) is transferred to the elastic relief chambers 44, as shown in FIG. 9B. After the impact force recedes, the elastic relief chambers 44 contract and the shear thickening fluid 42 is redirected back to the secondary deformable impact chambers 40, as shown in FIG. 9C. In various aspects, when the primary deformable impact absorber 38 the secondary deformable impact chambers 40 return to their original shape, they may act as a vacuum to assist in the transfer of the shear thickening fluid 42 back to the secondary deformable impact chambers 40.

Figure 10A:
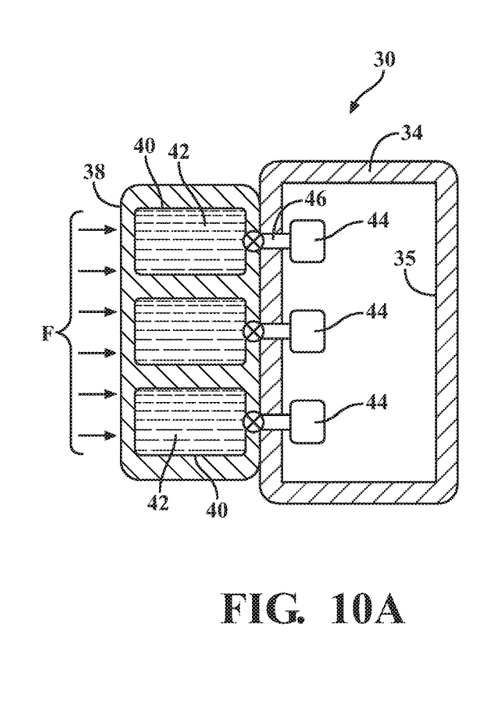
FIGS. 10A-10C illustrate the bumper assembly of FIG. 4 upon receiving a high force impact, for example, greater than about 12 MPH, and returning to a rest state.
Figure 10B:
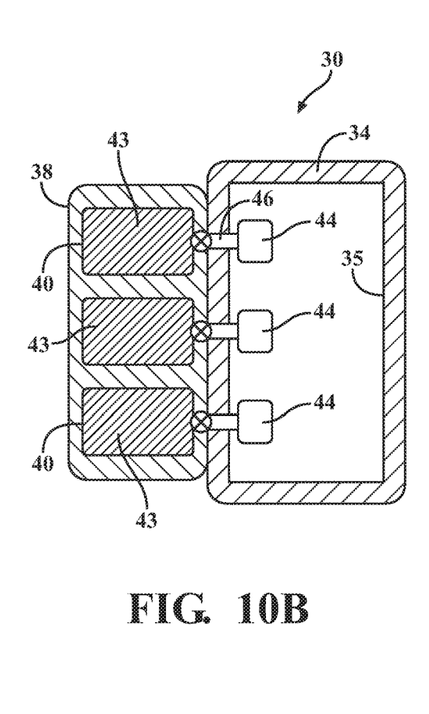
Figure 10C:
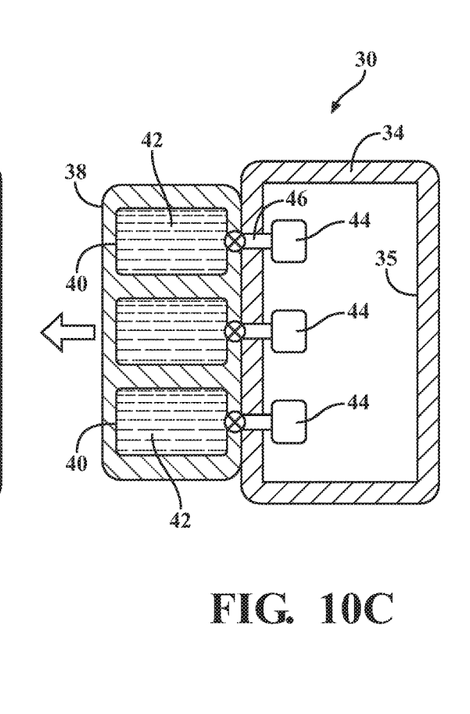

FIGS. 10A-10C provide a third illustrative example of the bumper assembly of FIG. 4 upon receiving a high force impact, for example, with a relative velocity between an object and a vehicle traveling greater than about 12 MPH (i.e., Zone 3 of FIG. 7), and returning to a rest state. In this example, upon receiving an impact force in a third, high range of shear stress as shown in FIGS. 10A-10B, the shear thickening fluid 43 instantaneously transitions and stiffens to a solid-like state. In various aspects, the viscosity is increased in an amount up to about >1000 times the lowest viscosity exhibited with lower shear rates. As shown in FIG. 10B, the secondary deformable impact chambers 40 substantially retain their respective shapes, and the primary deformable impact absorber 34 essentially transfers the impact force to the bumper reinforcement member 34 and the frame assembly 36. After the impact force recedes, the viscosity of the shear thickening fluid 42 lowers and the shear thickening fluid 42 becomes fluidic once again, as shown in FIG. 10C.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A variable shear control energy absorption system for a vehicle, the system comprising:
   a vehicle frame component;
   a primary deformable impact absorber located adjacent the vehicle frame component;
   a plurality of secondary deformable impact chambers located within the primary deformable impact absorber, each secondary deformable impact chamber comprising a shear thickening fluid that exhibits a decreasing viscosity responsive to an impact force exerting a first range of shear rates, and exhibits an increasing viscosity responsive to an impact force exerting a second range of higher shear rates;
   at least one elastic relief chamber in fluid communication with the plurality of secondary deformable impact chambers, the elastic relief chamber configured to:
      temporarily accept the shear thickening fluid from the plurality of secondary deformable impact chambers after the plurality of secondary deformable impact chambers receive an impact force exerting shear rates within the first range, and
      redirect the shear thickening fluid back to the secondary deformable impact chambers after the impact force recedes.

2. The energy absorption system according to claim 1, wherein the vehicle frame component defines an interior cavity and the at least one elastic relief chamber is located within the interior cavity.

3. The energy absorption system according to claim 1, comprising a plurality of elastic relief chambers in respective fluid communication with the plurality of secondary deformable impact chambers.

4. The energy absorption system according to claim 1, wherein the primary deformable impact absorber defines each of the plurality of secondary deformable impact chambers such that the secondary deformable impact chambers are fully encapsulated within the primary deformable impact absorber.

5. The energy absorption system according to claim 4, wherein the primary deformable impact absorber comprises at least one of a rubber and a silicone material, and the primary deformable impact absorber is configured to retain its shape after receiving an impact force such that the secondary deformable impact chambers act as a vacuum to transfer the shear thickening fluid from the at least one elastic relief chamber and back to the secondary deformable impact chambers.

6. The energy absorption system according to claim 1, wherein the vehicle frame component comprises a bumper reinforcement member.

7. The energy absorption system according to claim 1, further comprising a plurality of transfer tubes providing fluid communication between the plurality of secondary deformable impact chambers and the at least one elastic relief chamber.

8. The energy absorption system according to claim 7, further comprising a valve disposed in each transfer tube and configured to retain the shear thickening fluid within the secondary deformable impact chambers until the valve is subjected to a predetermined pressure.

9. The energy absorption system according to claim 7, wherein the vehicle frame component defines a plurality of apertures configured to receive the plurality of transfer tubes.

10. The energy absorption system according to claim 7, wherein at least two of the transfer tubes have different diameters.

11. The energy absorption system according to claim 7, comprising a plurality of transfer tubes coupling a single secondary deformable impact chamber to the elastic relief chamber.

12. The energy absorption system according to claim 1, wherein the shear thickening fluid is configured to instantaneously transition to a solid-like state upon receiving an impact force of greater than about 12 MPH, such that the shear thickening fluid is not capable of passing through to the elastic relief chamber, and the primary deformable impact absorber transfers the impact force to the vehicle frame component.

13. The energy absorption system according to claim 12, wherein the shear thickening fluid comprises a polyethylene glycol medium with about 60% by weight of 500 nm diameter spherical silica particles.

14. The energy absorption system according to claim 1, wherein the plurality of secondary deformable impact chambers are arranged in an array pattern, comprising at least one series of chambers extending in a longitudinal direction and at least one series of chambers extending in a vertical direction with respect to the vehicle frame component.

15. A vehicle bumper assembly with a variable shear control energy absorption system, the assembly comprising:
   a bumper reinforcement member defining an interior cavity;
   a primary deformable impact absorber adjacent to the bumper reinforcement member;
   a plurality of secondary deformable impact chambers located within the primary deformable impact absorber, each secondary deformable impact chamber comprising a shear thickening fluid;
   at least one elastic relief chamber located within the interior cavity of the bumper reinforcement member and in fluid communication with the plurality of secondary deformable impact chambers;
   wherein the shear thickening fluid is fluidic and exhibits a decreasing viscosity responsive to an impact force exerting less than a predetermined shear rate, and the shear thickening fluid stiffens to a solid-like state and exhibits an increasing viscosity responsive to an impact force exerting greater than the predetermined shear rate.

16. The vehicle bumper assembly according to claim 15, wherein:
   upon receiving an impact force in a first, low range of shear stress, the primary and secondary deformable impact chambers are configured to temporarily deform in shape and thereafter return to a rest state, with the shear thickening fluid remaining in a fluidic state in the secondary deformable impact chambers;
   upon receiving an impact force in a second, medium range of shear stress, the primary deformable impact absorber is configured to compress the secondary deformable impact chambers, and at least a portion of the shear thickening fluid remains in a fluidic state and is transferred to the elastic relief chamber, and redirected back to the secondary deformable impact chambers after the impact force recedes;

upon receiving an impact force in a third, high range of shear stress, the shear thickening fluid stiffens to a solid-like state, the secondary deformable impact chambers retain their respective shapes, and the primary deformable chamber transfers the impact force to the bumper reinforcement member.

17. The vehicle bumper assembly according to claim 15, further comprising a plurality of transfer tubes providing fluid communication between the plurality of secondary deformable impact chambers and the at least one elastic relief chamber.

18. The vehicle bumper assembly according to claim 17, further comprising a valve disposed in each transfer tube and configured to retain the shear thickening fluid within the secondary deformable impact chambers until the valve is subjected to a predetermined pressure.

19. The vehicle bumper assembly according to claim 17, wherein at least two of the transfer tubes have different diameters.

20. The vehicle bumper assembly according to claim 15, further comprising a flexible bumper fascia cover.

* * * * *